April 8, 1930.  E. H. McCLOUD  1,753,994
BUMPER
Filed July 26, 1928    2 Sheets-Sheet 1
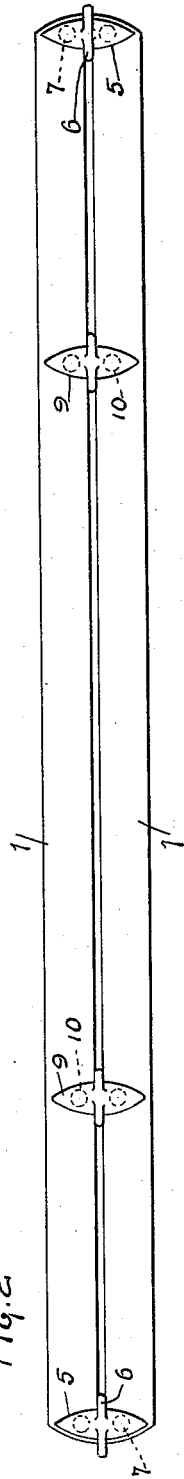
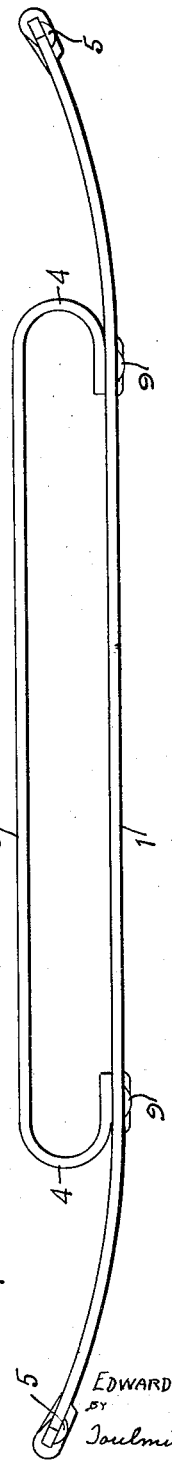
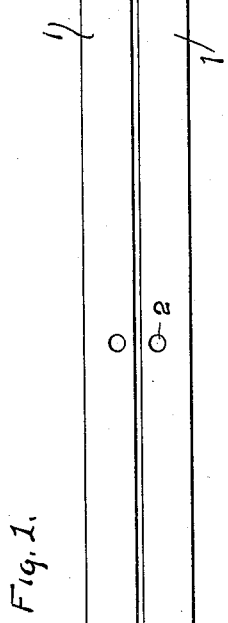
Inventor
EDWARD H. McCLOUD,
BY
Toulmin & Toulmin
Attorneys Inventor
EDWARD H. McCLOUD,
BY Toulmin & Toulmin
Attorneys Patented Apr. 8, 1930

1,753,994

UNITED STATES PATENT OFFICE

EDWARD H. McCLOUD, OF COLUMBUS, OHIO, ASSIGNOR TO THE CENTRAL BRASS AND FIXTURE COMPANY, OF SPRINGFIELD, OHIO, A CORPORATION OF OHIO

BUMPER

Application filed July 26, 1928. Serial No. 295,417.

This invention relates to bumper bars.

It is the object of this invention to provide a bumper bar in which the parts are securely attached, and in which the parts are reduced to a minimum number consistent with durability and efficiency. It is an object of this invention to provide a bumper in which there are two parallel bars, united by cross pieces which are securely welded to the bars in at least four places.

It is also an object of this invention to provide a bumper of this type, in which the back bar is securely welded to the bumper bars in such a way as to form a permanent and lasting union between the parts.

It is a further object of this invention to provide a bumper in which the back bar serves as a union, or as a means of uniting the parts of the bumper bars proper.

In the accompanying drawings there is exhibited a preferred embodiment of this device, which is used merely for the purpose of illustration.

Referring to the drawings:

Figure 1 is a face view of the two bars that constitute the main part of the bumper.

Figure 2 shows the bumper bars assembled to form the main part of the bumper.

Figure 3 is a plan view showing the completed bumper.

Figure 4:
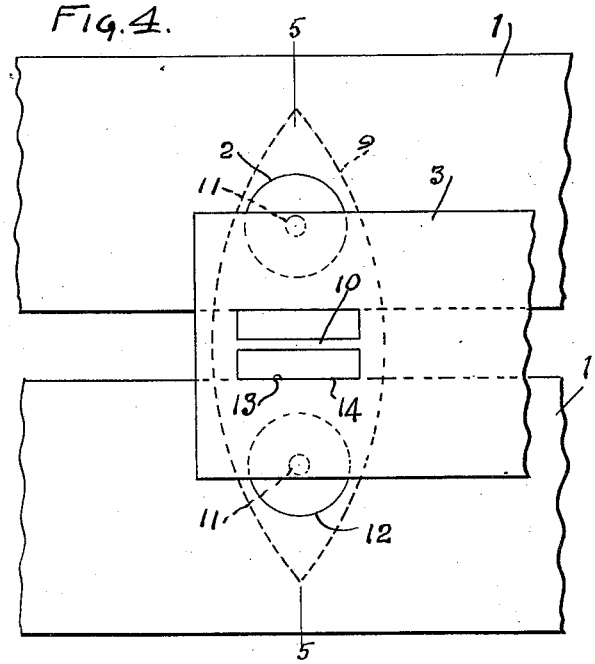
Figure 4 is a back view showing the manner in which the back bar is attached to the bumper bars.

This device is composed essentially of three parts, two parallel bumper bars and a back bar. The bumper bars are two in number, each indicated by the numeral 1. In each of the bars 1 there is formed a series of holes 2, the purpose of which will be later described.

The back bar is composed of one piece of metal 3, looped at each end, as indicated by the numeral 4, where it is united with the bumper bars.

Figure 6:
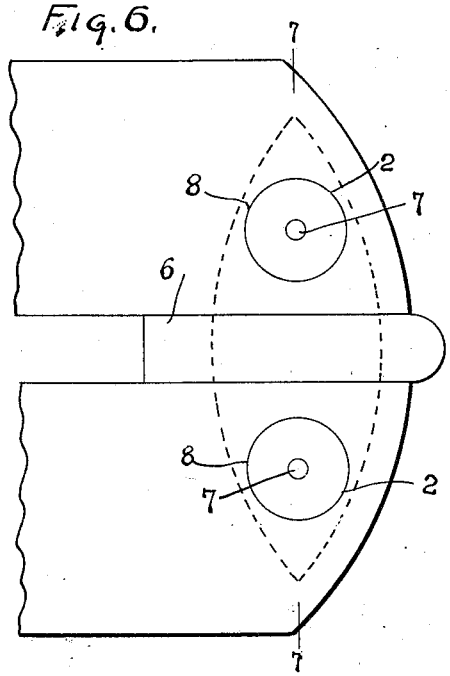
Figure 6 is a view showing the manner in which the ends of the bars are united.

At each end of the bumper bars are end clamps, which are shown in Figure 6. Each of these end clamps, indicated by the numeral 5, has projecting from the center thereof a long lug 6, which fits between the two bumper bars and holds them in spaced relation. These lugs 6 are a little deeper than the thickness of the bumper bars and are longer than the width of the clamps.

Figure 7:
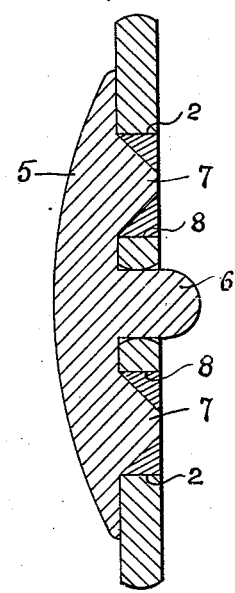
Figure 7 is a cross section on the line 7—7 of Figure 6.

Near each end of the end clamp are studs 7 in the form of a pyramid. These studs are adapted to be fitted into the holes 2 in the bumper bars. When the end clamps are placed in position with the lug 6 between the bars, the studs 7 fit into the holes 2 and leave a cavity 8 between the walls of the hole and the stud 7. This cavity is filled up by a process of welding, in whcih a part of the welding material is deposited in this cavity and securely holds and welds the parts together. The appearance of this structure is indicated in Figure 7.

Figure 5:
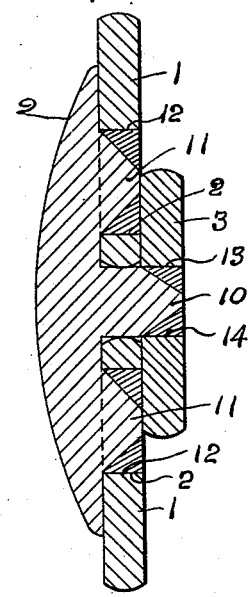
Figure 5 is a cross section on the line 5—5 of Figure 4.

Each end of the bar has a clamp similar to this. The two pairs of middle holes are adapted to receive clamps of somewhat the same general shape. This clamp is indicated by the numeral 9, and has extending from the central part thereof a stud 10. This stud is better illustrated in Figure 5. On each side of this stud are weld cups formed by bevelling each side of the end of the stud 10. There are also conical studs 11 near the ends of this clamp member. These studs 11 project through the holes 2 and form a circular cavity 12. The welding material is deposited in this cavity and securely binds the parts together.

The looped ends of the back bar have formed therein a rectangular opening 13 adapted to receive the outer cuneal end of the stud 10. This opening or hole in the looped end of the back bar forms with the beveled part of the stud 10 a weld cup 14. This weld cup is filled in the process of welding by a proper welding material in a high state of heat. By this process the bumper bars, the clamps and the back bar are securely welded to each other. The bumper bars are securely welded to each other in four places, while the bumper bars and the back bar are welded to each other in two places.

By this means there is provided substantially a one-piece bumper, constructed in such a way as to be durable and lasting, and in which the parts are permanently and securely fastened to each other.

I desire to comprehend within my invention such modifications as may be clearly embraced within my claims and the scope of my invention.

Having thus fully described my invention, what I claim as new and desire to secure by Letters Patent, is:

1. In a bumper, a pair of bumper bars arranged in parallel spaced relation to each other, and a plurality of clamp members welded to the bars and holding them in said spaced relation to each other, each clamp member having a spacer lug extending between said bars.

2. In a bumper, a pair of bumper bars arranged in parallel spaced relation to each other, a back bar having holes therein engaging the bumper bars and extending across the space therebetween, clamp members, each having a stud thereon engaging the bumper bars with the studs fitting in said space and in the holes in the back bar and welded thereto.

3. In a bumper, a pair of bumper bars arranged in spaced parallel relation to each other and having a series of holes therein, a hole in each bar being adjacent a hole in the other bar, a back bar having holes therein and engaging the bumper bars and extending across the space therebetween, clamp members, each clamp member having studs projecting through a hole in each of the bars, and another stud projecting therefrom and extending through the space between the bumper bars and into the hole in the back bar, said clamps being welded to the bumper bars where the studs pass through the holes therein and to the back bar where the stud passes through the hole therein.

4. In a bumper, a pair of bumper bars arranged in spaced parallel relation to each other, each bar having a series of holes arranged therein, the holes of one bar being adjacent the holes of the other, clamp members having studs thereon adapted to fit in the holes, and being attached to the bar in a permanent relation at the point where the studs pass through the holes.

5. In a bumper, a pair of bumper bars arranged in spaced parallel relation to each other, each having a series of holes, the holes of one bar being adjacent the holes of the other, a back bar having the ends thereof looped and placed upon the bumper bar with the loops thereof engaging the bumper bars across the space, and a plurality of clamp members engaging the bumper bars and the back bar to hold them in fixed permanent relation to each other.

6. In a bumper, a pair of bumper bars arranged in spaced parallel relation to each other, oval shaped clamp members having studs projecting therefrom, said clamp members being welded to the bars with the studs between the bars and to hold the bars in fixed spaced relation to each other.

7. In a bumper, a pair of bars arranged in spaced relation to each other, each bar having a series of holes arranged therein, the holes of one bar being adjacent the holes of the other bar, and clamp members having studs thereon fitting in the holes, said studs being welded to said bars in said holes.

8. In a bumper, a pair of bars arranged in spaced relation to each other, each bar having a series of holes arranged therein, the holes of one bar being adjacent the holes of the other bar, and clamp members, each clamp member having a spacer lug fitting between said bars and a pair of studs, each stud engaging a hole in a different bar and welded to the bar.

9. In a bumper, a pair of bars arranged in spaced relation to each other and having a series of holes therein, one hole of one bar being adjacent a hole of the other bar, a back bar having holes therein and engaging said pair of bars and extending across the space therebetween, and clamp members, each having a pair of studs, each stud engaging a hole in a different bar, and a spacer lug fitting between said pair of bars and projecting into a hole in the back bar and permanently fastened thereto.

In testimony whereof, I affix my signature.

EDWARD H. McCLOUD.